(12) United States Patent
Brandon

(10) Patent No.: US 6,508,056 B1
(45) Date of Patent: Jan. 21, 2003

(54) DUCT BURNER WITH CONICAL WIRE MESH AND VANES

(75) Inventor: Robert Brandon, Ottawa (CA)

(73) Assignee: Her Majesty the Queen in right of Canada, as represented by the Minister of Natural Resources, Ottawa (CA)

(*) Notice: Subject to any disclaimer, the term of this patent is extended or adjusted under 35 U.S.C. 154(b) by 0 days.

(21) Appl. No.: 09/904,531

(22) Filed: Jul. 16, 2001

(51) Int. Cl.$^7$ .................................................. F02K 3/10
(52) U.S. Cl. ........................ 60/261; 60/39.511; 431/5; 431/7; 431/12; 431/170
(58) Field of Search .......................... 60/39.5, 39.511, 60/261, 761; 431/5, 7, 12, 181, 170, 183, 187, 329, 347, 352, 353

(56) References Cited

U.S. PATENT DOCUMENTS

| | | |
|---|---|---|
| 2,718,754 A | 9/1955 | Lewis |
| 3,095,699 A | 7/1963 | Baver |
| 3,298,176 A | 1/1967 | Forsyth et al. |
| 3,457,902 A | 7/1969 | Gjerde |
| 3,524,632 A * | 8/1970 | Davies ........................ 432/187 |
| 3,866,411 A | 2/1975 | Marion et al. |
| 3,934,553 A | 1/1976 | Freeman, Jr. et al. |
| 4,116,005 A | 9/1978 | Willyoung |
| 4,313,300 A | 2/1982 | Wilkes et al. |
| 4,333,310 A | 6/1982 | Uram |
| 4,353,206 A | 10/1982 | Lee |
| 4,354,347 A | 10/1982 | Tomlinson et al. |
| 4,381,643 A * | 5/1983 | Stark ........................... 60/303 |
| 4,473,537 A | 9/1984 | Ford, Jr. et al. |
| 4,492,085 A | 1/1985 | Stahl et al. |
| 4,706,612 A | 11/1987 | Moreno et al. |
| 5,365,730 A | 11/1994 | Brückner et al. |
| 5,412,938 A | 5/1995 | Keller |
| 5,461,853 A | 10/1995 | Vetterick |
| 5,961,321 A * | 10/1999 | Vetterick et al. ............. 431/350 |

FOREIGN PATENT DOCUMENTS

| | | |
|---|---|---|
| CA | 2226990 | 2/1997 |
| CA | 2248570 | 7/1998 |

* cited by examiner

Primary Examiner—Charles G. Freay
Assistant Examiner—John F Belena
(74) Attorney, Agent, or Firm—Robert A. Wilkes

(57) ABSTRACT

A recuperated microturbine system including a low temperature duct burner in the exhaust gas which accommodates significant variations in the exhaust gas flow from the recuperator, which burns the added hydrocarbon fuel, for example natural gas, reasonably efficiently, without generating a significant amount of additional $NO_x$. A wire mesh burner is used to burn the added fuel in part of the exhaust gas from the recuperator. The duct burner is operated either in a more or less radiant combustion mode, or in a blue flame mode. The remainder of the recuperator exhaust gas, which bypasses the afterburner, is heated mainly by radiant heat transfer from the wire mesh burner. The use of the wire mesh burner minimises additional $NO_x$ formation. In the duct burner the dynamic pressure of the exhaust gas is used to overcome the inherent static pressure loss of the wire mesh burner. The fuel flow, and exhaust air flow, to the burner are both controlled to provide stable combustion, in relation to the heat content required in the exhaust gas.

10 Claims, 1 Drawing Sheet

DUCT BURNER WITH CONICAL WIRE MESH AND VANES

FIELD OF THE INVENTION

This invention relates to a so-called microturbine power plant. More particularly, this invention relates to a combination of a microturbine and a secondary fuel burner in the gas turbine exhaust gas. The gas turbine drives an electrical generator and can have the generator unit built directly onto the turbine shaft. The secondary fuel burner is used to improve the quantity and quality of the heat content of the exhaust gas to a point where it can be used as a heat source for a number of purposes, such as for an absorption chiller, for space heating, for steam generation, and for water heating. As a consequence of the properties of the secondary fuel burner this invention provides a means to obtain useful heat recovery without any increase in $NO_x$ formation.

BACKGROUND OF THE INVENTION

In the past, electricity for commercial and domestic use has been generated on a large scale. Originally, either hydroelectric generation or coal fired power stations were used; in more modern practice oil, natural gas, and atomic energy are all used as alternatives to coal to provide the required heat. In recent times, a need has been identified for a small power plant to provide the electrical needs of a small facility, typically having a power requirement in the range of 25kW to 500kW. For a power plant of this size, both atomic energy and coal are not suitable as fuels. Small generating systems have been developed having this power rating in which the prime mover is a gas turbine, in which a liquid or gaseous hydrocarbon fuel is burnt to generate the required heat. A typical microturbine unit of this type is described by Gjerde, in U.S. Pat. No. 3,457,902. As described, the microturbine combustor utilises only a small proportion of the oxygen in the intake air to burn the hydrocarbon fuel; the microturbine exhaust gas typically contains about 16–19% oxygen by volume, compared to about 21% in the intake air. In order to minimise fuel use, the turbine exhaust gas is used to heat the intake air in a recuperator; such units are known as recuperated microturbines.

In practise, it has been found that recuperated microturbine units have three disadvantages.

First, although the exhaust gas leaving the recuperator is hot, it does not have enough heat content to be very useful beyond being used to generate hot water. Second, although the combustion conditions can be improved to use more of the oxygen to obtain higher exhaust gas temperatures, this will also cause increased $NO_x$ formation. Recuperated turbines generally operate at a low rate of $NO_x$ emission: values as low as 0.06 g/kWh or 1.8 ppm $NO_x$ are known. This combination of operating parameters provides exhaust gasses leaving the recuperator at a temperature of no more than 250° C., which is only useful for space heating and hot water.

Third, in addition to Gjerde noted above, several proposals have been made to burn more fuel in at least a proportion of the exhaust gas, for instance by Freeman et al. in U.S. Pat. No. 3,934,553 and by Vitterick, in U.S. Pat. No. 5,461,853. These proposals rely on the oxygen consumption in the turbine combustor. Two difficulties then arise. First, the quantity of exhaust gas available from the turbine is only constant if the working load on the turbine is also constant: in practise this is not often the case. Second, if the added fuel is to be burnt efficiently the production of $NO_x$ increases significantly.

There is still, therefore, a need for a recuperated microturbine unit which includes an afterburner system which will accommodate quite significant differences in the amount of available exhaust gas, which will increase the heat content of the exhaust gas, and which will burn the added fuel at a low combustion temperature without any significant increase in $NO_x$ formation.

SUMMARY OF THE INVENTION

This invention seeks to provide a recuperated microturbine system including a duct burner in the exhaust gas which accommodates significant variations in the exhaust gas flow from the recuperator, which burns the added hydrocarbon fuel, for example natural gas, reasonably efficiently, and which does not utilise combustion conditions which generate additional $NO_x$. In the low temperature duct burner of this invention, a wire mesh burner is used to burn the added fuel in part of the exhaust gas from the recuperator. This burner is operated in either a more or less radiant combustion mode or preferably in the so-called "blue flame" mode, with lean gas mixtures at 50% of the stoichiometric fuel to gas ratio. The remainder of the recuperator exhaust gas, which bypasses the afterburner, is heated by heat transfer from the wire mesh burner. The fuel flow, and exhaust air flow, to the duct burner are both controlled to provide stable combustion, in relation to the heat content required in the exhaust gas.

DETAILED DESCRIPTION OF THE INVENTION

Thus in a first broad embodiment this invention provides a duct burner, for use in an exhaust gas stream contained within an exhaust gas duct from a recuperated microturbine, including in combination:

(a) an exhaust gas intake tube, of the same cross sectional shape as, and smaller cross sectional area than, the exhaust gas duct, mounted substantially coaxially with the exhaust gas duct, which intake tube has a first upstream end which receives exhaust gas and a second downstream end;

(b) a throttle means located in the intake tube adjacent its first upstream end constructed and arranged to control exhaust gas flow in the intake tube;

(c) a fuel feed for a hydrocarbon fuel located in the intake tube adjacent to the throttle plate; and (d) a wire mesh burner attached to the second downstream end of the intake tube and extending in a down stream direction from the second end of the intake tube;

wherein the wire mesh burner comprises a burner membrane consisting of a non-sintered fabric type membrane fabricated from heat resistant stainless steel fibre bundles in which the fibres have a substantially parallel arrangement and an equivalent fibre diameter of from about $1\mu$ to about $150\mu$.

Alternatively, the duct burner further includes:

(e) a perforated radiation tube, of the same cross section shape as, of a larger cross sectional area than, and mounted substantially coaxially with, the intake tube to extend in a down stream direction from the second end of the intake tube to a point beyond the end of the wire mesh burner.

Preferably, the wire mesh burner membrane has the same cross sectional shape as the intake duct. More preferably, the wire mesh burner is conical, with its wide end attached to the second end of the intake duct.

Preferably, the hydrocarbon fuel is natural gas.

Preferably, both the exhaust gas duct, the exhaust gas intake tube and the perforated radiation tube if used are cylindrical, and the wire mesh burner is conical, with its wide end attached to the second end of the intake duct. More preferably, both the exhaust gas duct, the exhaust gas intake tube and the perforated radiation tube if used are cylindrical, the radius of the exhaust gas intake tube is about one half of the radius of the exhaust gas duct, and the wire mesh burner is conical, with its wide end attached to the second end of the intake duct.

Alternatively, both the exhaust gas duct, the exhaust gas intake tube and the perforated radiation tube if used have a rectangular cross section, the cross sectional area of the exhaust gas intake tube is about one quarter of the cross sectional area of the exhaust gas duct, and the wire mesh burner has a pyramidal shape, with its wide end attached to the second end of the intake duct.

In a further alternative, both the exhaust gas duct, the exhaust gas intake tube and the perforated radiation tube if used have a square cross section, the cross sectional area of the exhaust gas intake tube is about one quarter of the cross sectional area of the exhaust gas duct, and the wire mesh burner has a square pyramidal shape, with its wide end attached to the second end of the intake duct.

Preferably, sufficient hydrocarbon fuel is burnt in the wire mesh burner to increase the temperature of the incoming exhaust gas by at least about 50° C. and by no more than about 500° C.

Preferably, the throttle means comprises a plate rotatable on a axis which is substantially perpendicular to the axis of the exhaust gas intake tube.

BRIEF DESCRIPTION OF THE DRAWINGS

The invention will now be described with reference to the attached drawings in which.

Figure 1:
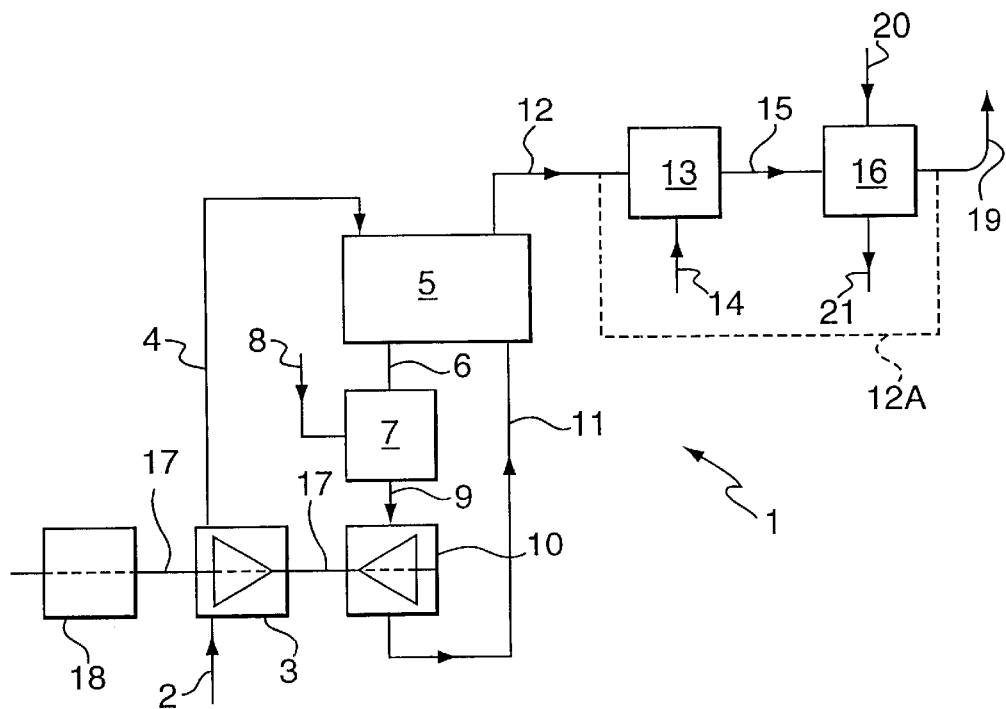
FIG. 1 shows a schematic layout for a typical microturbine power generating unit.

Referring first to FIG. 1, air is sucked into the microturbine unit 1 through the air intake 2 by the compressor 3. The compressed air in line 4 enters the recuperator 5, where it is heated further. The heated compressed air in line 6 passes into the combustor 7. In the combustor 7, fuel entering in line 8 is mixed with the hot compressed air from line 6, and some of the oxygen in it is burnt with the fuel. The hot combustion gas passes through line 9 into the gas turbine 10. Exhaust gas leaves the turbine through line 11 to enter the recuperator 5, where some its heat content is recovered by heating the compressed air entering the recuperator in line 4. The cooled exhaust gas leaves the recuperator in the exhaust gas duct 12. The compressor 3 and the turbine 10 are both mounted onto a common shaft 17, which also carries a high speed electrical generator unit 18; rotation of the turbine 10 induced by the gas flow in line 9 also rotates the generator 18 to provide electrical power.

In the conventional recuperated microturbine unit, the exhaust gas is usually vented directly to a suitable stack 19, as indicated by the chain line 12A. In some units, the exhaust gas is passed through a second heat recovery unit, for example to provide hot air for space heating, and then vented to a suitable stack.

In a recuperated microturbine unit according to this invention, the exhaust gas leaves the recuperator 5 in the exhaust duct 12 and passes to the duct burner unit 13. In the duct burner 13, more of the oxygen in the exhaust gas in the exhaust gas duct 12 is burnt with further fuel in line 14, to raise the exhaust gas temperature. The heated exhaust gas leaves the burner in a continuation 15 of the exhaust gas duct. After passing through the heat exchanger 16 the exhaust gas is vented through a suitable stack 19. A second fluid also flows through the heat exchanger 16, entering in line 20 and leaving in line 21. The second fluid is usually either air, or water. When the second fluid is water, the heat exchanger 16 can be used to provide either hot water or to provide steam.

Since the combustor 7 burns only some of the oxygen in the intake air in line 2, and since much of the heat in the exhaust gas in line 11 is used in the recuperator 5 to heat the compressed air in line 4 ahead of the combustor 7, the temperature of the exhaust gas in the exhaust gas duct 12 is quite low: typical values are in the range of from about 150° C. to about 250° C. This value is too low to provide a useful amount of heat. The exhaust gas at this point in the system will also usually contain at least about 17% oxygen.

In the duct burner, the temperature of the incoming exhaust gas can be increased by at least about 100° C., and should not be increased by more than about 500° C. This will raise the temperature of the exhaust gas from being in the range of from about 150° C. to about 250° C. to being in the range of from about 600° C. to about 750° C. If the amount of fuel burnt in the duct burner is increased to a level which will increase the exhaust gas temperature to above about 750° C. the possibility of increased $NO_x$ formation increases significantly.

Figure 2:
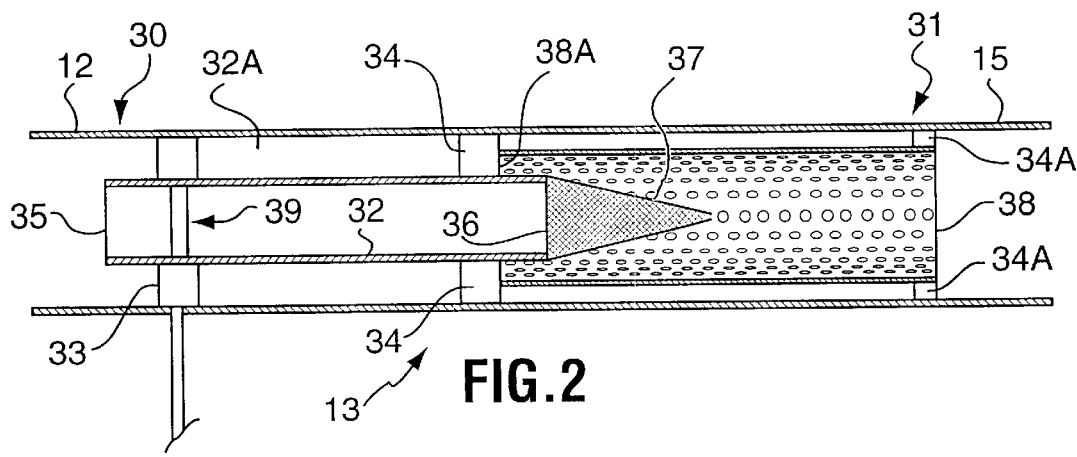
FIG. 2 shows schematically a burner assembly according to this invention.

The duct burner 13 is shown in more detail in FIG. 2. Referring first to FIG. 2, the burner 13 is located within the exhaust gas duct 12 after the recuperator. Exhaust gas enters at the upstream end 30 in the duct 12 and leaves at the downstream end 31 in the continuation 15 of the exhaust gas duct 12. The exhaust gas tube 32 is mounted coaxially with the exhaust gas duct 12 by means of the vanes 33 at the upstream end and the vanes 34 at the downstream end. These supports are conveniently located at an angle relative to the axis of the afterburner so as to generate some swirling action within the exhaust gas, which improves heat transfer to the exhaust gas. At the downstream end 36 of the tube 32 a wire mesh burner 37 is mounted. The construction of this form of burner is described in U.S. Pat No. 6,065,963, and the textiles used in its fabrication are described in U.S. Pat. No. 6,025,282. As shown a conical wire mesh burner is used, since the exhaust gas duct is cylindrical. It is preferred that the burner is of more or less the same cross sectional shape as the exhaust gas duct, and also that it should taper inwardly toward the downstream end 31 of the duct 12. It then follows that since both square and rectangular ducts are known, for such ducts a square or rectangular wire mesh burner should be used. To obtain the desired taper, the wire mesh burner will then be of a pyramidal shape, with a square, or rectangular, base.

The wire mesh burner 37 can be surrounded by a co-axial perforated radiation tube 38, which extends sufficiently beyond the downstream end of the wire mesh burner 37 to contain the burner flame. The radiation tube is desirable when the duct burner is to be operated at a low temperature, in the so-called radiant heat mode. When the burner is operated in the so-called blue flame mode a radiation tube 38 does not appear to be required.

As shown, the radiation tube 38 is conveniently attached to the downstream vanes 34; it is also desirable to support the radiation tube with a second set of vanes near to, or at, its downstream end, such as are shown at 34A. The radiation tube 38 is sized to provide a small clearance 38A with the wire mesh burner 37. The perforations in the radiation tube are sized to optimise the radiant to convective heat transfer process from the burner to the remainder of the exhaust gas flowing in the space between the radiation tube 38 and the exhaust gas duct 12.

Figure 3:
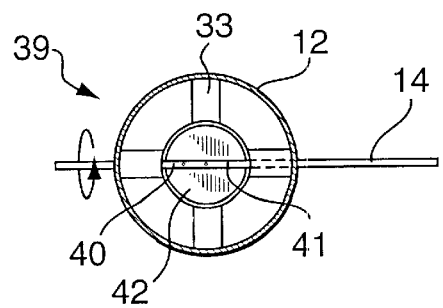
FIG. 3 shows the fuel inlet and throttle plate used in the low temperature duct burner shown in FIG. 2.

A combined throttle unit and fuel jet system 39 is mounted near the upstream end 35 of the tube 32; this is shown in more detail in FIG. 3. In FIG. 3 it is assumed that the hydrocarbon fuel is natural gas; the construction would be somewhat different for a liquid hydrocarbon fuel. The combined unit 39 is supported within the exhaust gas duct 12 adjacent the vanes 33, so that the fuel feed line 14 can be located within one of the vanes. The line 14 is connected to a hollow spindle 40 which includes several fuel jets 41. Both the number of jets, the location of the jets and the jet sizes, will be determined by the amount of fuel to be burnt. A throttle butterfly plate 42 is also mounted onto the spindle 40. It is also contemplated that the fuel line 14 can be connected to several fuel jets located in the wall of the tube 32 adjacent the butterfly plate; a solid spindle 40 is then used. The setting of the throttle plate controls how much of the available incoming exhaust gas flow passes through the tube 32, and equally how much passes through the annular space 32A between the tube 32 and the duct 12. When the duct burner is in use, the throttle plate 42 will usually be at an angle to the axis of the tube 32, and thus will also serve to generate some turbulence which assists in mixing the exhaust gas with the fuel. A suitable mechanism (not shown) is used to rotate the throttle plate 42 on the spindle 40. The position of the throttle plate 42 is chosen to fit the available gas flow and to provide an optimum fuel/oxygen mixture at the mesh burner. A spark ignition system, not shown, is used to ignite the gas on the burner.

In the arrangement shown, the throttle plate 42 rotates with the spindle 40 so that the fuel jets 41 are often at an angle to the exhaust gas flow, which promotes mixing of the fuel and gas.

In operation, the fuel is burnt in a flame which is more or less in and on the wire mesh of the burner 37. The proportion of the incoming exhaust gas flowing through the tube 32 and the burner 37 is thus heated directly. The remainder of the exhaust gas flowing through the annular space 32A is heated in part by radiation and by mixing with the gas from the burner 37 downstream of the end of the burner, or of the radiation tube 38 if this is present. The use of the co-axial tube 32 allows the dynamic pressure in the exhaust gas to overcome the static back pressure inherent in the wire mesh of the burner 37. This allows the burner to operate without the need for additional fans or blowers in the gas stream.

What is claimed is:

1. An afterburner, for use in an exhaust gas stream contained within an exhaust gas duct from a recuperated microturbine, including in combination:

(a) an exhaust gas intake tube, of the same cross sectional shape as, and smaller cross sectional area than, the exhaust gas duct, mounted substantially coaxially with the exhaust gas duct, which intake tube has a first upstream end which receives exhaust gas and a second downstream end;

(b) a throttle means located in the intake tube adjacent its first upstream end constructed and arranged to control exhaust gas flow in the intake tube;

(c) a fuel feed for a hydrocarbon fuel located in the intake tube adjacent to the throttle plate; and (d) a wire mesh burner attached to the second downstream end of the intake tube and extending in a down stream direction from the second end of the intake tube;

wherein the wire mesh burner comprises a shaped burner membrane consisting of a non-sintered fabric type membrane fabricated from heat resistant stainless steel fibre bundles in which the fibres have a substantially parallel arrangement and an equivalent fibre diameter of from about $1\mu$ to about $150\mu$.

2. An afterburner according to claim 1 further including:

(e) a perforated radiation tube, of the same cross section as, of a larger cross sectional area than, and mounted substantially coaxially with, the intake tube to extend in a down stream direction from the second end of the intake tube to a point beyond the end of the wire mesh burner.

3. An afterburner according to claim 1, wherein the wire mesh burner membrane has the same cross sectional shape as the intake duct.

4. An afterburner according to claim 1 wherein the hydrocarbon fuel is natural gas.

5. An afterburner according to claim 1 wherein both the exhaust gas duct, the exhaust gas intake tube and the perforated radiation tube are cylindrical, and the wire mesh burner is conical, with its wide end attached to the second end of the intake duct.

6. An afterburner according to claim 5 wherein both the exhaust gas duct, the exhaust gas intake tube and the perforated radiation tube are cylindrical, and a radius of the exhaust gas intake tube is about one half of a radius of the exhaust gas duct.

7. An afterburner according to claim 1 wherein the throttle means comprises a plate rotatable on a axis which is substantially perpendicular to an axis of the exhaust gas intake tube.

8. An afterburner according to claim 5 wherein both the exhaust gas duct, the exhaust gas intake tube and the perforated radiation tube are cylindrical, a radius of the exhaust gas intake tube is about one half of a radius of the exhaust gas duct, and the throttle means comprises a circular plate rotatable on a axis which is substantially perpendicular to an axis of the exhaust gas intake tube.

9. An afterburner according to claim 1 wherein the fuel feed comprises a hollow spindle located transversely across the intake tube having a plurality of fuel feed jets.

10. An afterburner according to claim 1 wherein the fuel feed comprises a hollow spindle located transversely across the intake tube and the throttle means comprises a plate rotatable on the hollow spindle.

* * * * *